No. 811,655. PATENTED FEB. 6, 1906.
A. B. McCAULEY.
WINDING MACHINE.
APPLICATION FILED SEPT. 21, 1904.
6 SHEETS—SHEET 1.
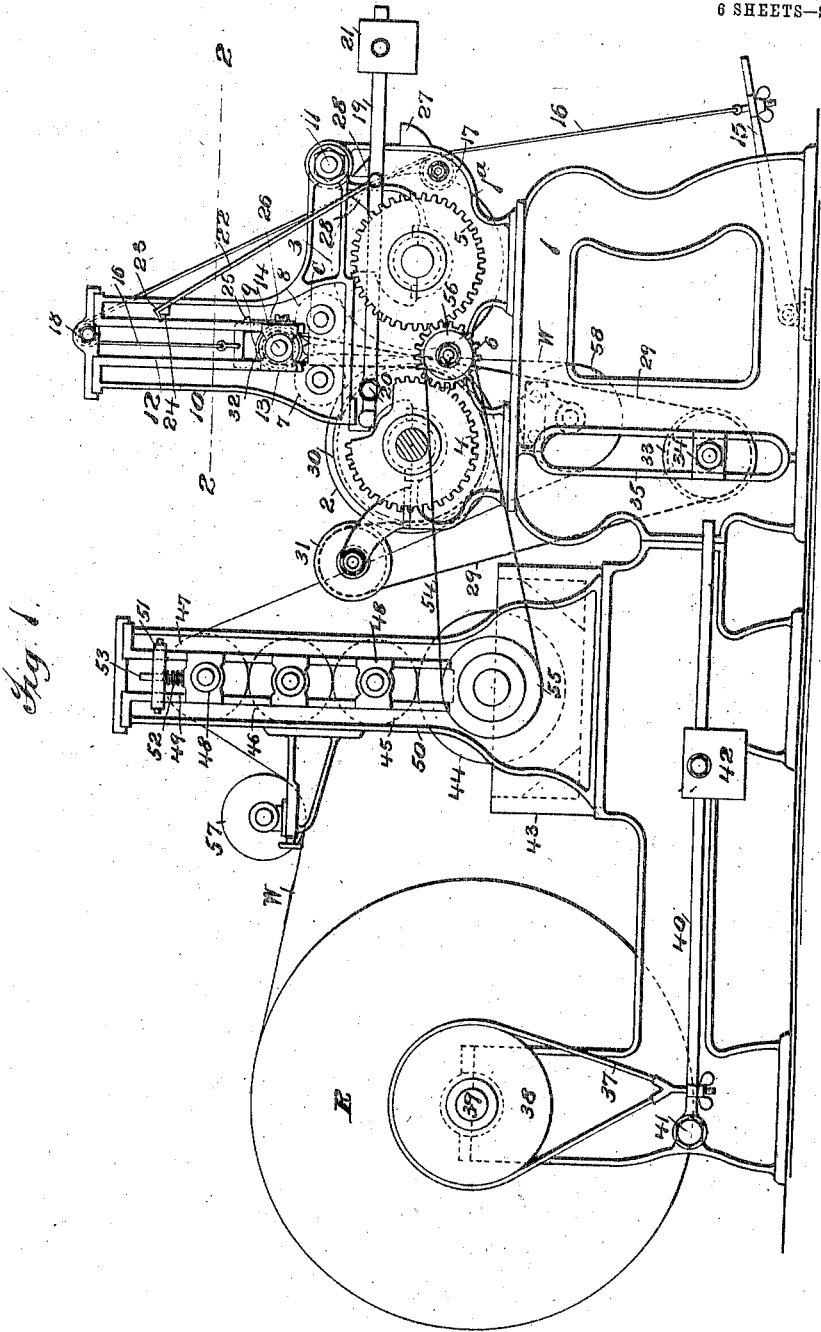
Witnesses
P B Philipp
W H Kennedy
Inventor
Albert B. McCauley
By his Attorneys
Philipp Sawyer Rice Kennedy

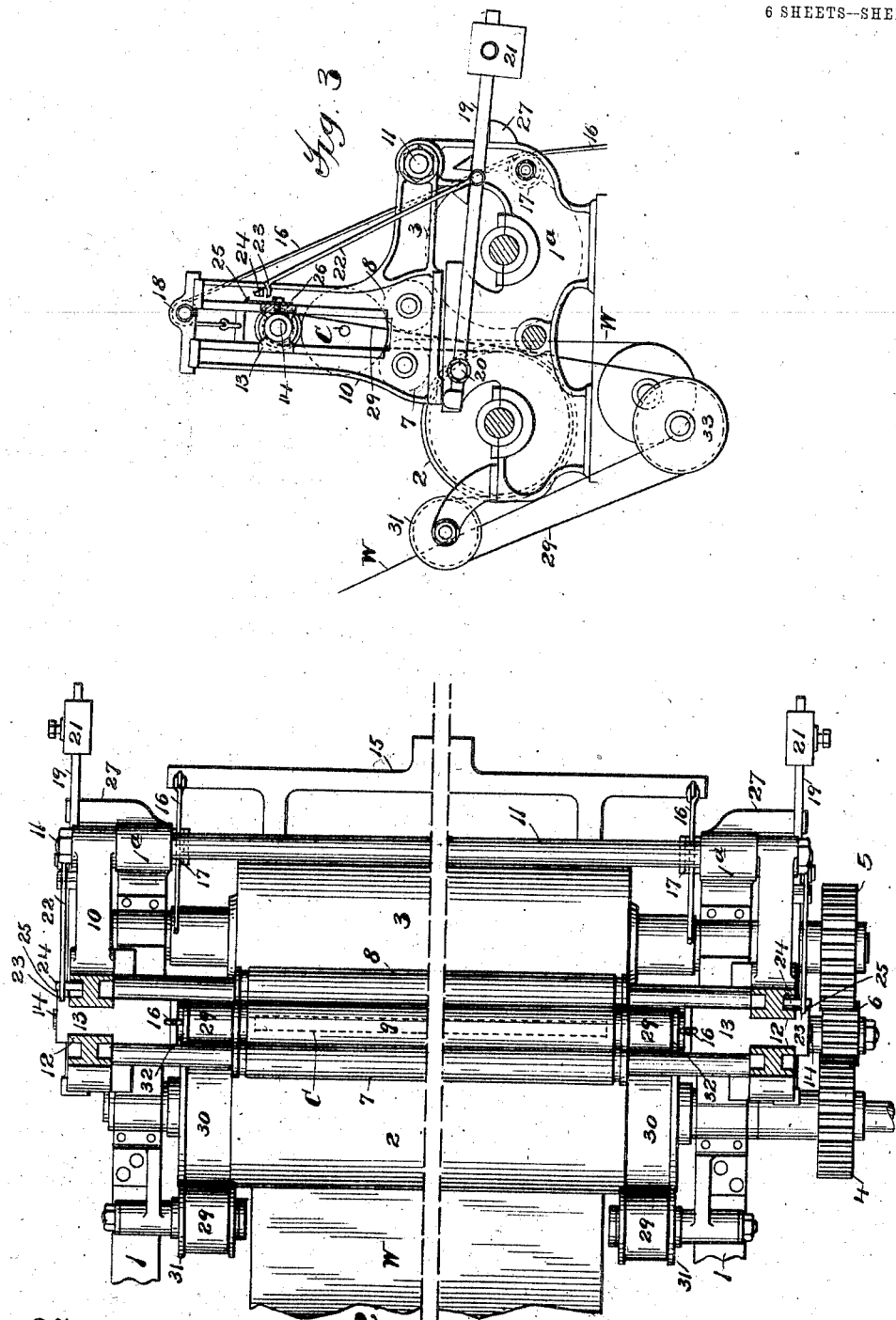

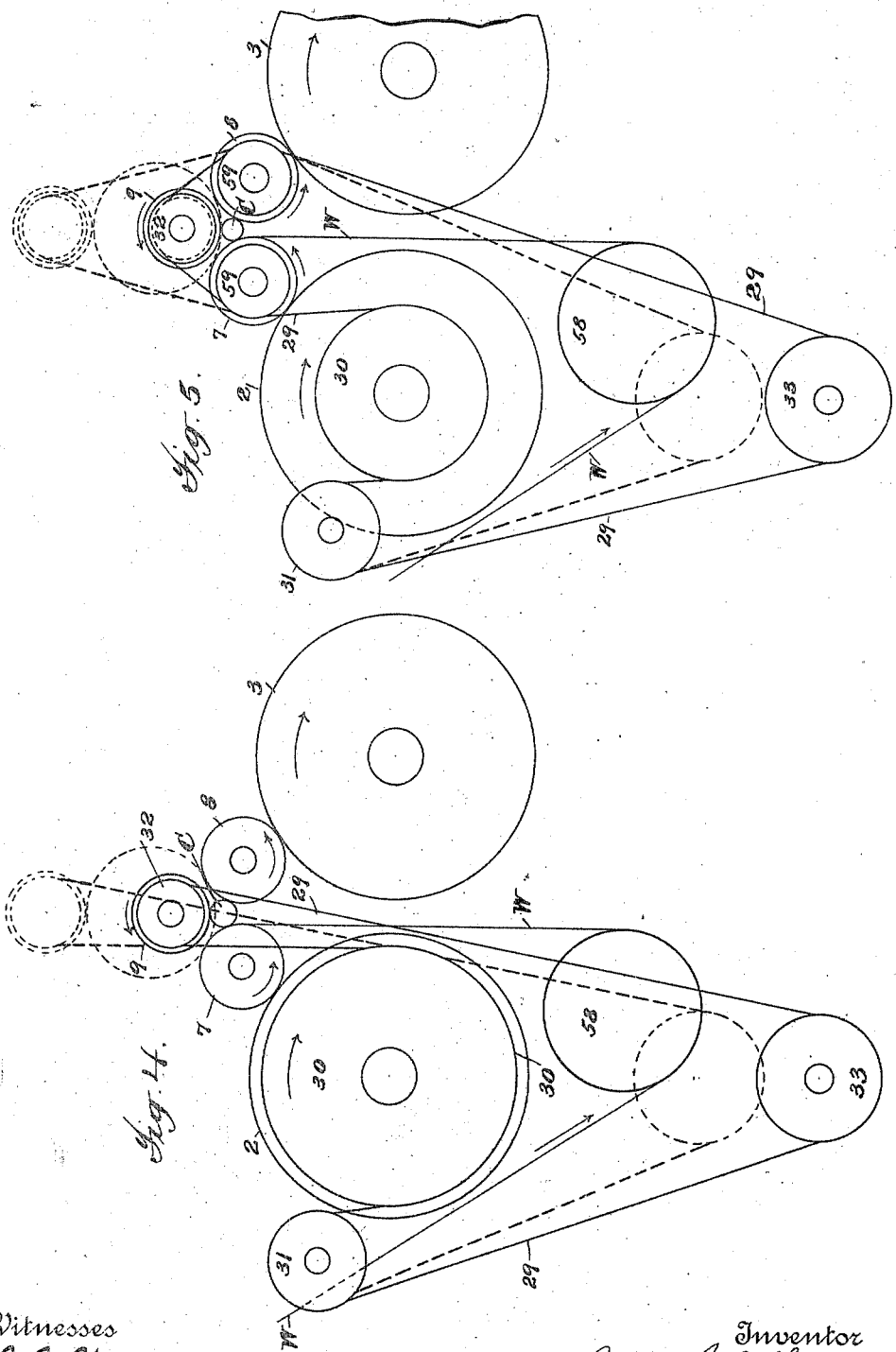

No. 811,655.  
PATENTED FEB. 6, 1906.
A. B. McCAULEY.
WINDING MACHINE.
APPLICATION FILED SEPT. 21, 1904.
6 SHEETS—SHEET 4.
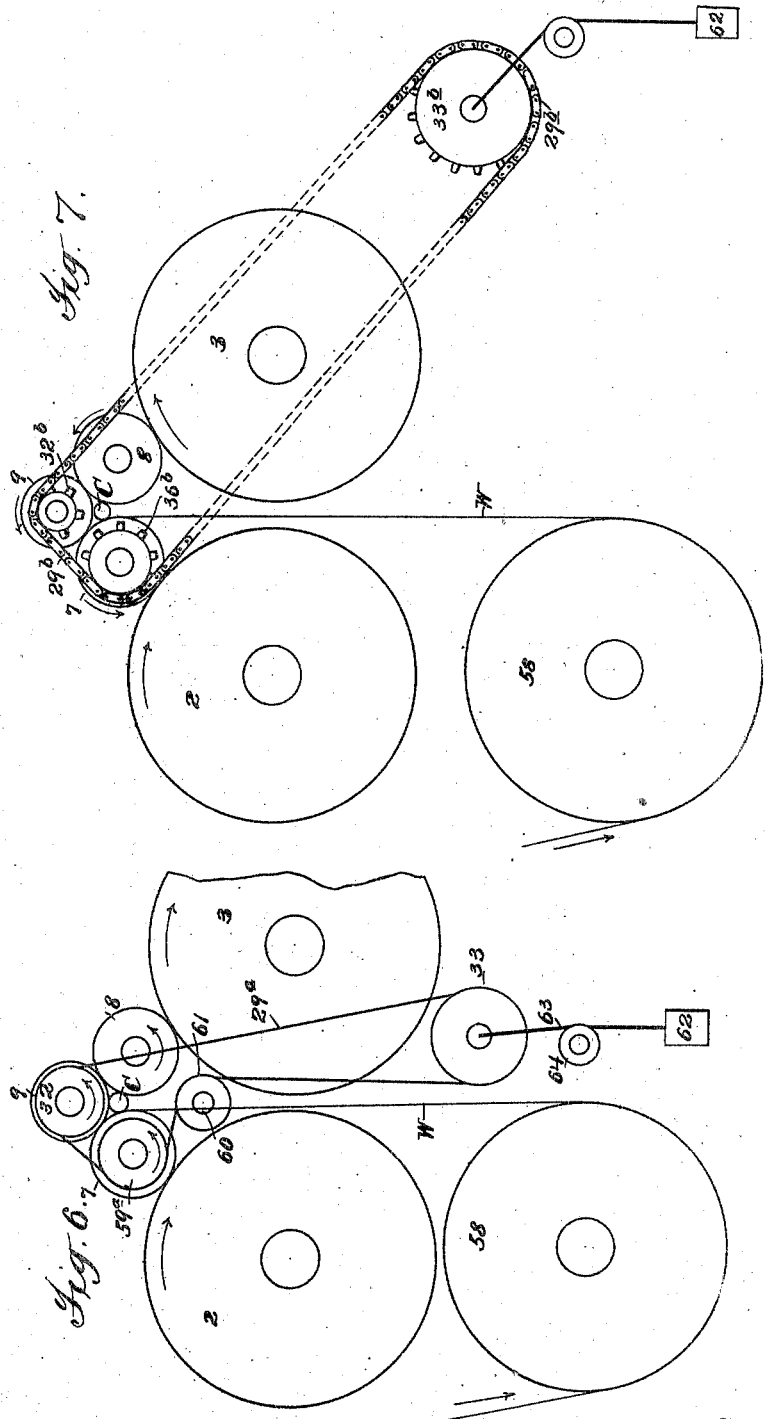
Witnesses  
P B Philipp  
W H Kennedy
Inventor  
Albert B. McCauley  
By his Attorneys  
Philipp Sawyer Rice Kennedy

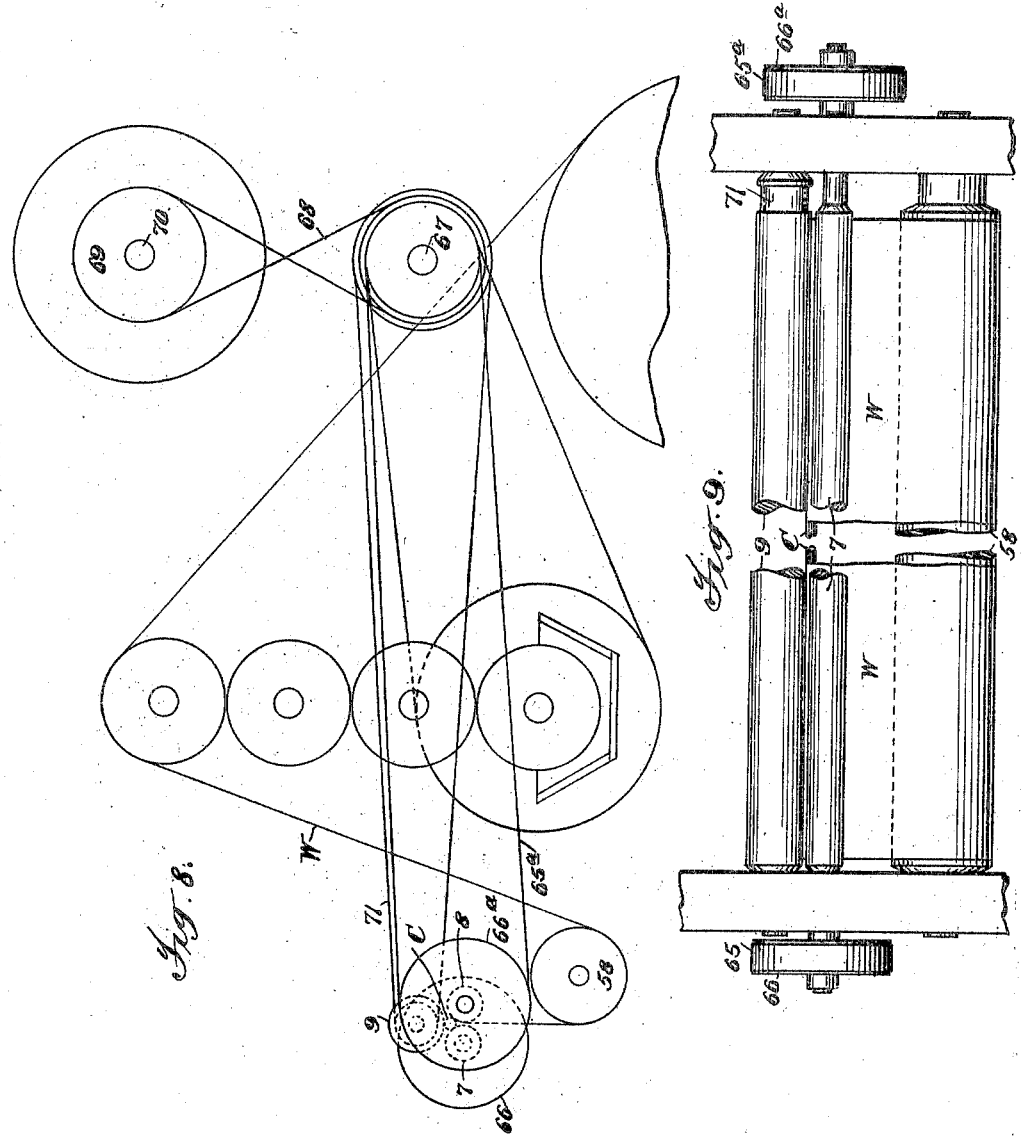

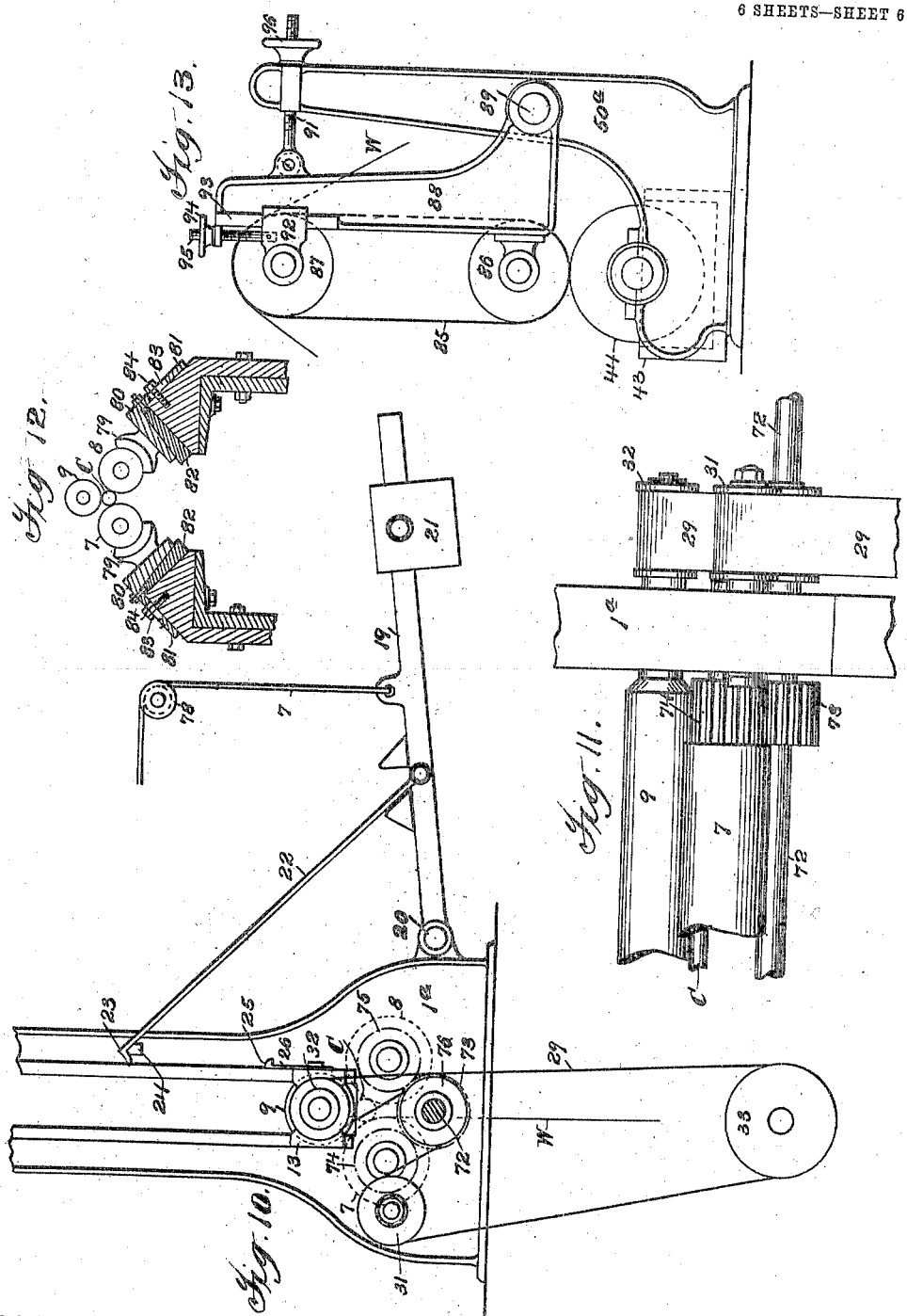

UNITED STATES PATENT OFFICE.

ALBERT B. McCAULEY, OF DENVER, COLORADO.

WINDING-MACHINE.

No. 811,655.　　　Specification of Letters Patent.　　　Patented Feb. 6, 1906.

Application filed September 21, 1904. Serial No. 225,327.

*To all whom it may concern:*

Be it known that I, ALBERT B. MCCAULEY, a citizen of the United States, residing at Denver, county of Denver, and State of Colorado, have invented certain new and useful Improvements in Winding-Machines, fully described and represented in the following specification and the accompanying drawings, forming a part of the same.

This invention relates to improvements in machines for winding continuous lengths of material, such as paper of any desired width, into compact tightly-wound hard rolls of any desired diameter suitable for use as blasting-plugs and for other purposes.

It is the object of the present invention to provide a mechanism by which a web of paper or other material may be wound into such a roll or plug of the proper diameter and of great compactness, tightness, and hardness, and in which the core of wood or other material on which the web is wound may be of the smallest possible diameter, although it will be understood that any size of core may be employed, as desired.

It is a further object of the present invention to provide a winding mechanism of this character in which the successive rolls or plugs produced will be of uniform diameter, so that when used for blasting purposes there will be no liability of the plugs sticking in the blasting-hole from being too large or fitting loosely in the blasting-hole from being too small in diameter.

It is a further object of the present invention to provide means of applying an adhesive to the material to be wound whereby a greater degree of tightness and solidity in the wound roll or plug may be secured.

For a better understanding of the improvements of the present invention a detailed description of an organization embodying the same will now be given in connection with the accompanying drawings, in which—

Figure 1 is a side elevation of the complete machine in its preferred form, showing also winding and pasting mechanism. Fig. 2 is a plan of the winding mechanism on an enlarged scale and partly in section on line 2 2 of Fig. 1. Fig. 3 is a side elevation, partly in section, of Fig. 2, illustrating the winding mechanism at the end of the winding operation. Fig. 4 is a diagrammatic view of the winding mechanism, showing the preferred drive for the winding mechanism. Figs. 5, 6, and 7 are diagrammatic views showing modifications of driving means for the winding mechanism. Fig. 8 is a diagrammatic view illustrating a modification in the winding mechanism and the driving mechanism therefor. Fig. 9 is an end view of the winding mechanism of Fig. 8. Fig. 10 shows another modified form of driving mechanism. Fig. 11 is a plan view of part of the mechanism shown in Fig. 10. Fig. 12 is a sectional detail illustrating another modification in the winding mechanism, and Fig. 13 is a modification of the pasting mechanism.

Referring to said drawings, and particularly to Figs. 1 to 4, which illustrate the present improvements in their preferred form, 1 indicates the frame of the machine, and $1^a$ uprights at one end thereof, in which are journaled a pair of drums 2 3. The shaft of roll or drum 2 projects beyond the frame (see Fig. 2) for connection with any suitable source of power and it and the shaft of roll 3 are geared together, (by gears 4 5 and intermediate 6,) so as to rotate in the same direction, as shown by the arrows in Fig. 4. These rolls or drums 2 3, which are constantly driven while the machine is in operation, in turn drive a pair of rolls or drums 7 8, which with an ironing member or roll 9 constitute the winding mechanism proper for winding the web of material (which will be hereinafter referred to as "paper") into a roll or plug suitable, for example, for blasting purposes, though it may of course be used for many other purposes.

As will hereinafter appear, the rolls or drums 2 3 may be omitted, the drums or rolls 7 8 in such case being driven in some other suitable way. The rolls or drums 2 3 are preferably employed, however, as aside from their function of driving the rolls of drums 7 8 they also perform the function of supporting the rolls 7 8. This is of great importance, for the reason that the rolls 7 8 when made of great length, as will often be the case in order to wind a web of great width, will have a tendency to sag, which would interfere with their proper operation. This tendency to sag is prevented or resisted by the rolls 2 3, which serve to properly support the rolls 7 8 throughout their length.

The winding-rolls 7 8 are, as shown, preferably frictionally driven by contact with the supporting-rolls 2 3, and during the winding operation they rotate a core C and wind the paper thereon, in which operation they are assisted by the ironing-roll 9, as will be more fully hereinafter stated.

The paper to be wound may be supplied from any suitable source in web form to the core C, which with the paper thereon is supported by the winding-drums 7 8, and said winding-drums rotating in the direction indicated by the arrows in Fig. 4 will, assisted by the roll 9, wind the paper on the core until the diameter of the roll or plug thus wound is of the desired size. When the roll or plug thus wound has reached the desired diameter, it is necessary to arrest the operation of winding, so that the wound plug or roll may be removed and a new core, with the end of the web attached to it, introduced between the winding-drums 7 8 and the roll 9, coacting therewith. In the present case the arrest of the winding operation is provided for by so mounting the winding-drums 7 8 that they may, when desired, be moved out of contact with the constantly-rotating supporting-rolls 2 3, by which said drums are driven. Preferably this movement of the winding-drums 7 8 out of contact with the rolls 2 3 is provided for in the manner shown—that is to say, by mounting the winding-drums 7 8 in a swinging frame 10, which is pivoted at 11 in the uprights 1ª at the end of the machine, so that said frame may at the proper time be swung upwardly, and thus withdraw the winding-drums 7 8 out of contact with the rolls 2 3, as illustrated in Fig. 3. This upward movement of the frame 10, and with it the winding-drums 7 8, is effected automatically when the plug or roll wound reaches the required diameter by mechanism which will be hereinafter more fully described. It will be understood, of course, that when said frame is swung upwardly and the winding-drums 7 8 thus withdrawn from contact with the rolls 2 3 rotation of said winding-drums 7 8 will cease, so that the plug or roll of paper which has been wound may be severed from the web and be withdrawn from between the winding-drums 7 8 and ironing-roll 9 and a new core then attached to the end of the web from which the roll or plug has been severed. The frame 10 being then lowered, so that the winding-drums 7 8, carried thereby, will again contact with and be driven by the supporting-rolls 2 3, the winding of the new roll or plug will be started.

The winding drums or rolls 7 8 may be of any desired length and of any desired diameter, so as to wind up a web of any width within the capacity of the paper-making machine and also wind such web into a roll or plug of any desired diameter. Where a web of great width is operated upon, the winding drums or rolls 7 8 will when of small diameter have a tendency to sag or bend at their centers, which would interfere with proper engagement between the winding drum for rolls and the paper to be wound, and thus result in the production of an improperly-wound plug or roll. To avoid this, the supporting-rolls 2 3 are employed, which not only drive the winding-drums 7 8, but also, as before stated, support these rolls or drums throughout their length, and thus prevent any sagging or bending of such rolls, which will, therefore, at all times properly engage the web of paper to be wound and produce a properly-wound roll or plug. The roll 9, which has heretofore been referred to as an "ironing-roll," not only performs the function of assisting the winding drums or roll 7 8 in turning the core of paper, but also performs the still more important function of smoothing or ironing out the paper as it is wound upon the core, (its surface speed, as shown, being greater than that of rolls 7 8,) thus bringing the convolutions into contact with each other and at the same time preventing the formation of any creases, wrinkles, or other irregularities in the winding of the plug or roll.

The winding-rolls 7 8 and the ironing-roll 9 must be laterally displaceable relatively to each other as the plug or roll of paper being wound increases in diameter. To provide for this, the roll 9 may be mounted in any suitable manner to permit it to move or yield laterally away from the drums 7 8. As shown and as preferred, it is mounted in the swinging frame or support 10, in which the winding-drums 7 8 are mounted, in the following manner: The support 10, it will be observed, is provided with vertical guides 12, on which a head 13 is free to slide vertically to and from the axis of the drums 7 8, and in this head 13 the shaft 14 of the ironing-roll 9 is journaled. At the beginning of the winding operation the sliding head 13, and therefore the roll 9, occupy their lowermost position. As the winding operation proceeds the roll 9 will bear by gravity against the roll or plug being wound, and thus press the convolutions of paper together and smooth or iron out the same, and said roll being rotated (by driving connections preferably independent of those for the winding-drums 7 8, as hereinafter described) it will assist the drums 7 8 in winding up the paper on the core. As the winding operation proceeds the diameter of the roll or plug being wound will of course increase, and as it so increases the ironing-roll 9 will, by reason of its mounting in the vertical sliding head 13, yield laterally in a vertical direction until the winding operation is finished, when the sliding head 13 may be lifted up and the roll 9 thus withdrawn from contact with the roll or plug and away from the winding-drums 7 8, so that the plug or roll of paper which has been wound may be readily withdrawn from between the winding-drums 7 8 and said roll 9. This lifting of the sliding head 13 and roll 9 is effected by means of a treadle 15, to which is attached a cord 16, passing over guide-pulleys 17 18 and connected with the sliding head 13. It will be understood that by pressing the treadle 15 downward the sliding head 13, and with it the roll 9, will be raised and the roll or plug of material then removed and a fresh spindle or core inserted by the operator for winding another plug or roll.

In winding-rolls of small diameter, such as those suitable for blasting-plugs, for which purpose the mechanism of the present invention has been particularly designed, it is desirable that the plugs or rolls shall be of a certain fixed or uniform diameter, so that no trouble will be experienced in using them for blasting purposes due to their being too large or too small for the blasting-holes in which they are to be inserted. In the present case this uniformity in diameter of the plugs or rolls produced by the winding mechanism is provided for by the employment of automatically-operating mechanism heretofore referred to, by which at a predetermined point in the winding of the plug or roll the winding-drums 7 8 are moved upwardly, and thus withdrawn from contact with the supporting-rolls 2 3 and the rotation of the drums 7 8 thus arrested. This mechanism will now be described in detail.

The winding drums or rolls 7 8 are, as before stated, mounted in the swinging frame 10, and the means for swinging said frame upwardly consists of a pair of levers 19, fulcrumed at 20 in the uprights 1ª on opposite sides of the machine, each of said levers being provided at its outer end with a weight 21 and bearing at its opposite or inner end against the lower free end of the swinging frame 10. Normally the inner end of said weighted lever 19 is, as shown at Fig. 1, out of contact with the lower free end of the swinging frame 10, the outer or weighted end of the lever being held in its uppermost position by means of a rod 22, pivoted at its lower end to the lever and provided at its upper end with a latch 23, adapted to hook over a stud or projection 24 on the side of the frame 10. When the latch 23 is hooked over the said stud or projection 24, the weighted end of the lever 19 is, as shown in Fig. 1, held by rod 22 in its uppermost position. The latch 23 is automatically disengaged from the stud or projection 24 by a projection 25 in the upper end of a plate 26, screwed to the sliding head 13, in which the ironing-roll 9 is journaled. At the beginning of the winding operation the latch 23 of the rod 22 will of course be hooked over the trip or projection 24, and the rod 22 remains in that position, holding the weighted end of the lever 19 in its upper position until the winding of the plug or roll of paper is completed—that is to say, until such roll or plug of paper has reached the required diameter. When this point is reached in the winding of the roll or plug, the sliding head 13 and ironing-roll 9 will have reached such a position in the frame 10 that the projection or trip 25 will engage the latch 23 of rod 22 and move said latch and rod out of engagement with the stud or projection 24, thus releasing the weighted end of the lever 19, the weight 21 on which will then rock said lever to the position illustrated in Fig. 3.

The plate 26, carrying trip 25, is adjustably secured to the head 13, (see Fig. 3,) so that said trip may be adjusted vertically, so as to release the latch 23 sooner or later, according to the diameter of paper roll or plug desired. Downward movement of the weighted end of the lever is limited by a stop 27, secured to the upright 1ª. As the lever 19 is rocked, as just described, its inner end engaging the free end of the swinging frame 10 will rock the latter upwardly into the position shown in Fig. 3, thus moving the winding-drums 7 8 out of driving engagement with the supporting-rolls 2 3. When the weighted lever 19 has been thus tripped and the swinging frame 10 swung upwardly, rotation of the winding-drums 7 8 will of course cease. When the plug or roll of paper is removed from between the winding-drums 7 8 and ironing-roll 9 and a new core inserted between them for winding, the operator will return the frame 10 to its lowermost position, with the winding-drums 7 8 in contact with supporting-rolls 2 3. This is effected by raising the weighted end of the lever 19, which then permits the free end of the frame 10 to descend and engaging latch 23 on rod 22 with projection 24, so that said rod 22 will hold the weighted end of the lever in its raised position. The rod 22 when disengaged from stud 24 is held in vertical position, so that it can be conveniently and readily grasped by the operator between blocks or stops 28 on the lever 19. Of course it will be understood that when the plug or roll of paper has been removed from between the rolls 7 8 9 the sliding head 13 and roll 9 will descend by gravity into close proximity to rolls 7 8, so that the projection 25 on the sliding head 13 will at the time the latch 23 is thus engaged with projection 24 be below the latter. It will also be understood that although in this description only one lever 19 is specifically referred to what has been said is equally applicable to the other.

It is desirable in order to secure a thorough tightening or compacting of the roll or plug of paper and the final construction of the matter after the winding operation has been finished, as just described, and rotation of drums 7 8 arrested that the ironing-roll 9 shall continue its rotation for a limited time in contact with the roll or plug which has been wound. Rotation at this time of the ironing-roll 9 is secured by providing connections for driving said roll independently of the winding-rolls 7 8, which connections will now be described. These connections consist for each side of the machine of a belt 29, passing around a pulley 30, fixed to the supporting-roll 2 or its shaft and which is therefore driven by said shaft, an idler-pulley 31, suitably mounted in the upright 1ª, a pulley 32, fixed to the roll 9 or the shaft thereof, and a tightening or compensating pulley 33, journaled in a sliding bearing consisting of a head 34, mounted to slide in a guideway 35 in the frame 1. The function of said pulleys 33 is to at all times maintain the belt 29 in a taut condition and to compensate for the lateral movement of the ironing-roll 9 as it is displaced by the increase in diameter of the plug or roll being wound, the bearing 34 for the pulley 33 rising in the guideway 35 as the roll 9 rises in the guides 12. By reason of these independent driving connections for the ironing-roll 9 said roll is driven not only while the winding-drums 7 8 are being driven, but also after the winding-rolls have been disconnected from the driving and supporting rolls 2 3, as before described, and are therefore at rest. Two advantages result from this arrangement: First, after the winding of the plug by drums 7 8 is completed the ironing-roll 9 continues to press or iron down the last convolution or convolutions of paper wound on the core, thus making a smooth, compact, and otherwise perfect product and forming a crease at which the operator is to tear the web to disconnect it from the finished roll, and, second, when on the release of the treadle 15 the ironing-roll 9 is dropped onto a fresh spindle or core to which the end of the web has been previously attached the roll 9 will serve to wind and secure the end of the web about the core, and thereby obtain a tight joint at the start of the winding operation, which is very desirable. It will also be observed that the connections for driving the roll 9 are such that the surface speed thereof will be greater than that of the rolls 7 8.

In making rolls or plugs it may and often will be found desirable to apply an adhesive to the web, so that a tighter and more compact roll or plug may be formed, this adhesive being applied to the web as it moves toward the winding mechanism and being preferably applied to but one side, so as to prevent the deposit of the adhesive on the rolls of the winding mechanism.

In Figs. 1 to 4 a pasting mechanism is shown for applying paste to one side of the web, which web, as shown in Fig. 1, is supplied to the winding mechanism from a roll R, suitably supported at the end of the machine opposite that in which the winding mechanism is mounted. Suitable strain is applied to this roll of paper, so as to prevent a too free unwinding thereof by a friction device consisting of a strap 37, passing over a pulley 38, fixed to the shaft 39, on which the roll R of paper is mounted, the ends of said strap being fastened to a lever 40, one end of which is pivoted at 41 in the frame of the machine and the other end of which is provided with a weight 42, which may be slid in and out upon the lever, so as to adjust the friction of the strap or belt 37 upon the pulley 38. From this roll R the web W of paper passes to the winding mechanism which has been described, and between the roll R and said winding mechanism is located the pasting mechanism, which will now be described. This pasting mechanism consists of a paste-fountain 43, a paste-roll 44, rotating in the fountain, two superposed distributing-rolls 45 46 above said paste-roll 44, and a depositing-roll 47, located above the roll 46 and over which the web W of paper passes on its way to the winding mechanism. The bearings 48 for the rolls 45 46 47 are mounted so as to slide vertically on guides 49, provided at opposite ends of a standard 50, secured to the frame 1 of the machine. Above each bearing 48 for the depositing-roll 47 is located a stop 51, between which and said bearing 48 a spring 52 is provided which encircles a pin 53, projecting upwardly from the bearing. The function of the springs 52 on opposite sides of the standard 50 is to hold the depositing-roll 47 in yielding frictional contact with the distributing-roll 46 and also to hold said distributing-roll in like contact with the distributing-roll 45, and the latter also in like contact with the paste-roll 44. These paste-rolls are driven by means of a belt 54, passing around a pulley 55 on the shaft of paste-roll 44, said pulley being driven, as shown in Fig. 1, by a pulley 56, fixed to the shaft of pinion 6.

Any other suitable form of pasting mechanism may be employed, but that illustrated and just described is preferred. If a very large quantity of paste is wanted on the material to be wound, there could be used only one roll which would run directly in the trough of paste, the paper running on top of this roll and getting the paste as it is carried by this roll from the trough. If a less amount of paste is desired, another roll could be added, making two rolls in all, the second roll resting on top of the first roll which runs in the trough of paste, the paste being transferred from the first roll to the second roll, and from the second roll to the paper. If still less paste is desired, a third or a fourth or a fifth roll could be added, one on top of the other. In fact, the number of rolls in the pasting mechanism controls the amount of paste delivered to the paper or other material which is being wound.

The operation of the pasting mechanism shown is as follows: The web W of paper as unwound from the roll R passes under a guide-pulley 57, and thence upwardly and over the paste-depositing roll 47, which is driven by the paste-roll 44 and which as the web of paper thus passes over it applies paste to its under side. After leaving the paste-depositing-roll 47 the web of paper passes downwardly and under a guide-roll 58 and thence upwardly between, but out of contact with, the supporting and driving rolls 2 3 to the core C, on which it is wound, with the pasted side of the web inside or nearest the axis of said core, so that no paste will be deposited upon any of the rolls of the winding mechanism.

If desired, pasting mechanism may be employed for applying paste to the upper side of the web, and such pasting mechanism may consist of a felt-covered perforated core resting against the upper side of the paper, and which may be supplied with paste from a tank or other suitable source of supply.

In Fig. 13 of the drawings a modified form of pasting mechanism is illustrated, which will be hereinafter described.

The winding mechanism, including the driving connections therefor, illustrated in Figs. 1 to 4, may be modified without departing from the present invention. In Figs. 5, 6, and 7 modifications in such mechanism are shown, which will now be described.

In the modified construction illustrated in Fig. 5 the belt 29 for driving the ironing-roll 9 is arranged substantially as in the preceding figures, except that it runs over idler-pulleys 59 upon the shafts of the winding-drums 7 8, the result of this arrangement of the belt 29 being that it is spread out by said idler-pulleys 59 into approximately triangular shape between rolls 7, 8, and 9. By this arrangement it follows that at the beginning of the winding operation the surface contact between the belt 29 and the periphery of the pulley 32 on the shaft of ironing-roll 9 is only equal to about one-quarter the periphery of that pulley. As the winding of the plug or roll of paper continues and said roll 9 is displaced vertically by such roll or plug the surface contact between the belt 29 and pulley 32 will gradually be increased, as illustrated by dotted lines in Fig. 5, and therefore the pressure of ironing-roll 9 on the plug or roll of paper and its speed of rotation correspondingly increased.

In the modification illustrated in Fig. 6 a rope 29$^a$ is employed in place of the belt 29 of the preceding figures for driving the roll 9, such ropes being provided at opposite sides of the machine. This rope 29$^a$ is driven by a shaft 60, to which is fixed a pulley 61, over which the rope 29$^a$ passes, said rope also passing over an idler-pulley 59$^a$ upon the shaft of the winding-drum 7, a pulley 32, fixed to the shaft of roll 9, and a tension-pulley 33, adapted to move vertically so as to compensate for the vertical displacement of the roll 9 as the plug or roll of paper is enlarged in diameter. The shaft of pulley 33 has a weight 62 attached to it by a cord 63 passing over a guide-pulley 64, the function of said weight being to resist the upward movement of said pulley 33, and to therefore at all times maintain the rope in a taut condition.

In the modification illustrated in Fig. 7 a sprocket-chain 29$^b$ is used in place of the belt and rope of the preceding figures, this sprocket-chain being driven by a sprocket-wheel 36$^b$, fixed to the shaft of the winding-drum 7 and passing over a sprocket-wheel 32$^b$, fixed to the shaft of the ironing-roll 9, and a yieldingly-mounted sprocket-wheel 33$^b$, the shaft of which, like the compensating pulley 33 of Fig. 6, is provided with a weight 62. The shaft of sprocket-wheel 33$^b$, it will be observed, is located in a vertical plane somewhat distant from that of the rolls or drums 7 8 9, so that the sprocket-chain 29$^b$ will be at an angle to said rolls, thereby securing greater tension on the sprockets of the rolls 7 9, it being understood that the sprocket-wheel 33$^b$ when it is displaced vertically to compensate for vertical displacement of the ironing-roll 9 will move obliquely toward the rolls 7 8.

In all of the figures of the drawings thus far described the winding mechanism is shown as comprising five rolls—namely, the ironing-roll 9, the rolls 7 8, and the rolls 2 3 for supporting and driving the latter. If desired, however, but three such rolls may be employed, particularly in those cases where a very small plug or roll of paper is to be wound. Such a construction as this is illustrated in Figs. 8 to 12, which will now be described.

In the construction illustrated in Figs. 8 and 9 the supporting and driving rolls of the preceding figures are omitted, the winding drums or rolls 7 8 in this case being driven by means of a belt 65, passing around a pulley 66, fast to one end of the winding drum or roll 7, and a belt 65$^a$, passing around a pulley 66$^a$, fast to the end of the winding drum or roll 8 and on the opposite side of the machine, the two belts 65 and 65$^a$ in turn passing around pulleys upon a shaft 67, rotated by a belt 68, passing around a pulley 69 on a shaft 70, driven from any suitable source of power and preferably provided with a pair of fast and loose pulleys by which the operation of the winding mechanism and other parts of the machine may be controlled in the usual manner. The ironing-roll 9 of Figs. 8 and 9 is driven by a belt 71, passing around a pulley upon the end of the ironing-roll and also around a pulley upon the shaft 67.

The pasting mechanism of Figs. 8 and 9 is like that of Fig. 1, except for certain details which need not be referred to.

In the construction illustrated in Figs. 10 and 11 the winding drums or rolls 7 8 are driven by a shaft 72, provided with a pinion 73, engaging pinions 74 75, fixed to the shafts of the winding drums or rolls 7 8, while the ironing-roll 9 is driven by means of a belt 29, passing around a pulley 76, fixed to the driving-shaft 72, an idler-pulley 31 in the upright 1ª, and a compensating pulley 33, such as illustrated in Figs. 1 to 4. In this construction also a modification is illustrated in the means for disconnecting the winding-drums 7 8 from their driving mechanism at a predetermined point in the winding of the plug or roll of paper. The mechanism for this purpose (illustrated in Fig. 10) consists of a lever 19, pivoted at 20 in the upright 1ª and provided at its outer end with a weight 21, this lever also being provided with a rod 22, having a latch 23, which hooks over a projection or stud 24 on the upright 1ª, from which it is disengaged by a projection 25 on the plate 26, secured to the sliding head 13, in which the winding and pressing roll is mounted. When the latch 23 is thus disengaged from projection or stud 24, the weight 21 will swing the lever 19 downwardly from the position in which it is shown in Fig. 10. As the lever is thus swung downwardly it will pull upon the cord or chain 77, passing over the guide-pulley 78, and the opposite end of which may be connected with a suitable clutch or fast and loose pulley mechanism, through which the shaft 72 is driven, and which clutch or fast and loose pulley mechanism will be so controlled by said lever 19 and cord 77 that when said lever is thus swung downwardly the shaft 72 will be disconnected from its driving mechanism and rotation thereof and of the drums 7 8 arrested.

In the construction illustrated in Fig. 12 three rolls 7 8 9 are shown in connection with means for supporting the rolls or drums 7 8, so as to avoid any slight spring which might occur if such rolls or drums were of any great length. The supporting means shown consists for each drum 7 8 of a block 79, having a concave face in which the drum rests, and the base 80 of which block is provided with a flange 81, said base and flange being at substantially right angles to each other and fitting over correspondingly-shaped portions of the upright 1ª. A wedge 82 is also provided adapted to be entered between the base 80 and that portion of the upright 1ª opposed to said base, which wedge may be forced between the upright and said base, so as to adjust the block 79 to proper position to support the drum 7 or 8, as the case may be. The flange 81 of the block 79 is provided with an opening 83 for the passage of a screw 84, by which the block is secured in position upon the upright, this opening 83 being in the form of a slot, so as to permit of the adjustment just referred to of the block 79 to and from the axis of the winding-drum 7 or 8, as the case may be.

Referring now to Fig. 13, the modification heretofore referred to in the pasting mechanism will now be described. In this case instead of employing a series of rolls for taking the paste from the paste-roll 44 and applying it to the web a belt 85 is provided, which passes around a roll 86, which holds said belt in contact with the paste-roll and a roll 87, over which the web W of paper passes from roll R of Fig. 1 to the winding mechanism. This belt may be of any suitable material, but is preferably of felt similar to the jacket of a coucher-roll. The rolls 86 87 referred to, around which this belt passes, are journaled in a bracket 88, pivoted at 89 in the standard 50ª, so that said frame may be swung on said standard by means of the nut and screw 90 91 to and from the paste-roll 44. The bearings 92 for the roll 87 are also adjustably mounted on guides 93 in the upper end of the frame 88 and are provided with a thumb nut and screw 94 95, by which they and the roll 87 may be adjusted vertically to take up the slack from the belt 85.

What I claim is—

1. The combination with a plurality of winding-rolls adapted to wind a web of material into a roll, of a laterally-displaceable ironing-roll having a greater surface speed coacting therewith and contacting with the roll of material as it is wound, substantially as described.

2. The combination with a plurality of winding-rolls adapted to wind a web of material into a roll, of a laterally-displaceable ironing-roll having a greater surface speed coacting therewith and contacting with the roll of material as it is wound, mechanism for driving said winding-rolls, and automatically-operating means for disconnecting said winding-rolls and driving mechanism at a predetermined point in the winding operation, substantially as described.

3. The combination with a plurality of winding-rolls adapted to wind a web of material into a roll, of a laterally-displaceable ironing-roll having a greater surface speed coacting therewith and contacting with the roll of material as it is wound, mechanism for driving said winding-rolls, and means controlled by said ironing-roll for disconnecting said winding-rolls and driving mechanism at a predetermined point in the winding operation, substantially as described.

4. The combination with a plurality of winding-rolls adapted to wind a web of material into a roll, of a laterally-displaceable ironing-roll having a greater surface speed coacting therewith and contacting with the roll of material as it is wound, and means for applying an adhesive to the web, substantially as described.

5. The combination with a plurality of winding-rolls adapted to wind a web of material into a roll and mechanism for driving said rolls, of a laterally-displaceable ironing-roll coacting therewith and contacting with the roll of material as it is wound, and connections for driving said ironing-roll independently of said winding-rolls, whereby its rotation may be continued after rotation of said winding-rolls has been arrested, substantially as described.

6. The combination with a plurality of winding-rolls adapted to wind a web of material into a roll and mechanism for driving said rolls, of a laterally-displaceable ironing-roll coacting therewith and contacting with the roll of material as it is wound, connections for driving said ironing-roll independently of said winding-rolls, whereby its rotation may be continued after rotation of said winding-rolls has been arrested, and automatically-operating means for disconnecting said winding-rolls and their driving mechanism at a predetermined point in the winding operation, substantially as described.

7. The combination with a plurality of winding-rolls adapted to wind a web of material into a roll and mechanism for driving said rolls, of a laterally-displaceable ironing-roll coacting therewith and contacting with the roll of material as it is wound, connections for driving said ironing-roll independently of said winding-rolls, whereby its rotation may be continued after rotation of said winding-rolls has been arrested, and means controlled by said ironing-roll for disconnecting said winding-rolls and their driving mechanism at a predetermined point in the winding operation, substantially as described.

8. The combination with a movable support, of a plurality of winding-rolls carried thereby adapted to wind a web of material into a roll, mechanism for driving the rolls, and automatically-operating means for moving the support to disconnect the winding-rolls from the driving mechanism at a predetermined point in the winding operation, substantially as described.

9. The combination with a swinging support, of a plurality of winding-rolls carried thereby adapted to wind a web of material into a roll, mechanism for driving the rolls, and automatically-operating means for swinging the support to disconnect the winding-rolls from the driving mechanism at a predetermined point in the winding operation, substantially as described.

10. The combination with a movable support, of a plurality of winding-rolls carried thereby adapted to wind a web of material into a roll, mechanism for driving the roll, automatically-operating means for moving the support to disconnect the winding-rolls from the driving mechanism at a predetermined point in the winding operation, an ironing-roll also mounted in said support and coacting with said winding-rolls and contacting with the roll of material as it is wound, and connections for driving said ironing-roll independently of the winding-rolls whereby the rotation of said ironing-roll may be continued after rotation of said winding-rolls has ceased, substantially as described.

11. The combination with a swinging support, of a plurality of winding-rolls carried thereby adapted to wind a web of material into a roll, mechanism for driving the rolls, automatically-operating means for swinging the support to disconnect the winding-rolls from the driving mechanism at a predetermined point in the winding operation, an ironing-roll also mounted in said support and coacting with said winding-rolls and contacting with the roll of material as it is wound, and connections for driving said ironing-roll independently of the winding-rolls whereby the rotation of said pressing-roll may be continued after rotation of said winding-rolls has ceased, substantially as described.

12. The combination with a movable support, of a plurality of winding-rolls carried thereby adapted to wind a web of material into a roll, mechanism for driving the winding-rolls, an ironing-roll coacting with said winding-rolls and contacting with the roll of material as it is wound, and means controlled by said ironing-roll for moving the support to disconnect the winding-rolls from their driving mechanism at a predetermined point in the winding operation, substantially as described.

13. The combination with a swinging support, of a plurality of winding-rolls carried thereby adapted to wind a web of material into a roll, mechanism for driving the winding-rolls, an ironing-roll coacting with said winding-rolls and contacting with the roll of material as it is wound, and means controlled by said ironing-roll for swinging the support to disconnect the winding-rolls from their driving mechanism at a predetermined point in the winding operation, substantially as described.

14. The combination with a movable support, of a plurality of winding-rolls carried thereby adapted to wind a web of material into a roll, mechanism for driving the winding-rolls, a weight adapted to move said support to disconnect the winding-rolls from the driving mechanism at a predetermined point in the winding operation, an ironing-roll coacting with said winding-rolls and contacting with the roll of material as it is wound, a latch mechanism holding said weight out of operative position and means moving with the ironing-roll for releasing the latch mechanism, substantially as described.

15. The combination with a swinging support, of a plurality of winding-rolls carried thereby adapted to wind a web of material into a roll, mechanism for driving the winding-rolls, a weight adapted to swing said support to disconnect the winding-rolls from the driving mechanism at a predetermined point in the winding operation, an ironing-roll coacting with said winding-rolls and contacting with the roll of material as it is wound, a latch mechanism holding said weight out of operative position and means moving with the ironing-roll for releasing the latch mechanism, substantially as described.

In testimony whereof I have hereunto set my hand in the presence of two subscribing witnesses.

ALBERT B. McCAULEY.

Witnesses:
GEORGE A. HILL,
THOMAS H. SAVERY, Jr.